United States Patent
Hashiguchi et al.

(10) Patent No.: US 10,405,103 B2
(45) Date of Patent: Sep. 3, 2019

(54) ELECTRET ELEMENT, MICROPHONE HAVING ELECTRET ELEMENT MOUNTED THEREIN AND ELECTRET ELEMENT MANUFACTURING METHOD

(71) Applicants: National University Corporation Shizuoka University, Shizuoka-shi, Shizuoka (JP); Saginomiya Seisakusho, Inc., Nakano-ku, Tokyo (JP)

(72) Inventors: Gen Hashiguchi, Hamamatsu (JP); Yuki Nishimori, Koganei (JP); Shinichi Arioka, Kagawa (JP); Masato Suzuki, Takamatsu (JP); Kazunori Ishibashi, Sayama (JP)

(73) Assignees: National University Corporation Shizuoka University, Shizuoka-shi (JP); Saginomiya Seisakusho, Inc., Tokyo (JP)

( * ) Notice: Subject to any disclaimer, the term of this patent is extended or adjusted under 35 U.S.C. 154(b) by 0 days.

(21) Appl. No.: 16/129,836

(22) Filed: Sep. 13, 2018

(65) Prior Publication Data
US 2019/0014419 A1    Jan. 10, 2019

Related U.S. Application Data

(62) Division of application No. 15/520,549, filed as application No. PCT/JP2015/079018 on Oct. 14, 2015.

(30) Foreign Application Priority Data

Oct. 22, 2014    (JP) .................................. 2014-215229

(51) Int. Cl.
   *H01C 17/08*    (2006.01)
   *H04R 19/01*    (2006.01)
   (Continued)

(52) U.S. Cl.
   CPC ......... *H04R 19/016* (2013.01); *C09K 3/1006* (2013.01); *H01G 7/025* (2013.01);
   (Continued)

(58) Field of Classification Search
   CPC combination set(s) only.
   See application file for complete search history.

(56) References Cited

U.S. PATENT DOCUMENTS 5,022,486 A    6/1991   Miura et al.
8,798,298 B1   8/2014   Burns et al.
(Continued)

FOREIGN PATENT DOCUMENTS

JP    2008-182666 A    8/2008
JP    2009-164539 A    7/2009
(Continued)

OTHER PUBLICATIONS

International Search Report (PCT/ISA/210) issued in PCT Application No. PCT/JP2015/079018 dated Dec. 15, 2015 with English-language translation (two (2) pages).
(Continued)

*Primary Examiner* — Amir H Etesam
(74) *Attorney, Agent, or Firm* — Crowell & Moring LLP

(57) ABSTRACT

An electret element includes: an electret film that contains silicon oxide; and a protective film formed over the electret film and constituted of aluminum oxide deposited through an atomic layer deposition method.

2 Claims, 8 Drawing Sheets

(51) Int. Cl.
*C09K 3/10* (2006.01)
*H04R 19/04* (2006.01)
*H04R 31/00* (2006.01)
*H01G 7/02* (2006.01)
*H04R 19/00* (2006.01)

(52) U.S. Cl.
CPC .............. *H01G 7/028* (2013.01); *H04R 19/04* (2013.01); *H04R 31/006* (2013.01); *H04R 19/005* (2013.01)

(56) References Cited

U.S. PATENT DOCUMENTS

| | | | |
|---|---|---|---|
| 2006/0172219 A1* | 8/2006 | Stasiak | G03G 15/221 430/118.6 |
| 2007/0195984 A1 | 8/2007 | Yang | |
| 2008/0155801 A1 | 7/2008 | Imanaka | |
| 2008/0157128 A1 | 7/2008 | Katz et al. | |
| 2014/0065318 A1 | 3/2014 | Suzuki et al. | |
| 2014/0065751 A1* | 3/2014 | Suzuki | H01G 7/025 438/50 |
| 2014/0145554 A1* | 5/2014 | Takeuchi | H02N 1/08 310/309 |
| 2016/0118912 A1 | 4/2016 | Hayashi | |

FOREIGN PATENT DOCUMENTS

| | | |
|---|---|---|
| JP | 2010-11547 A | 1/2010 |
| JP | 2013-13256 A | 1/2013 |
| JP | 2013-235978 A | 11/2013 |
| JP | 2014-50196 A | 3/2014 |

OTHER PUBLICATIONS

Japanese-language Written Opinion (PCT/ISA/237) issued in PCT Application No. PCT/JP2015/079018 dated Dec. 15, 2015 (three (3) pages).

Non-final U.S. Office Action issued in U.S. Appl. No. 15/520,549 dated Mar. 21, 2019 pp. 1-6 (eight (8) pages).

* cited by examiner

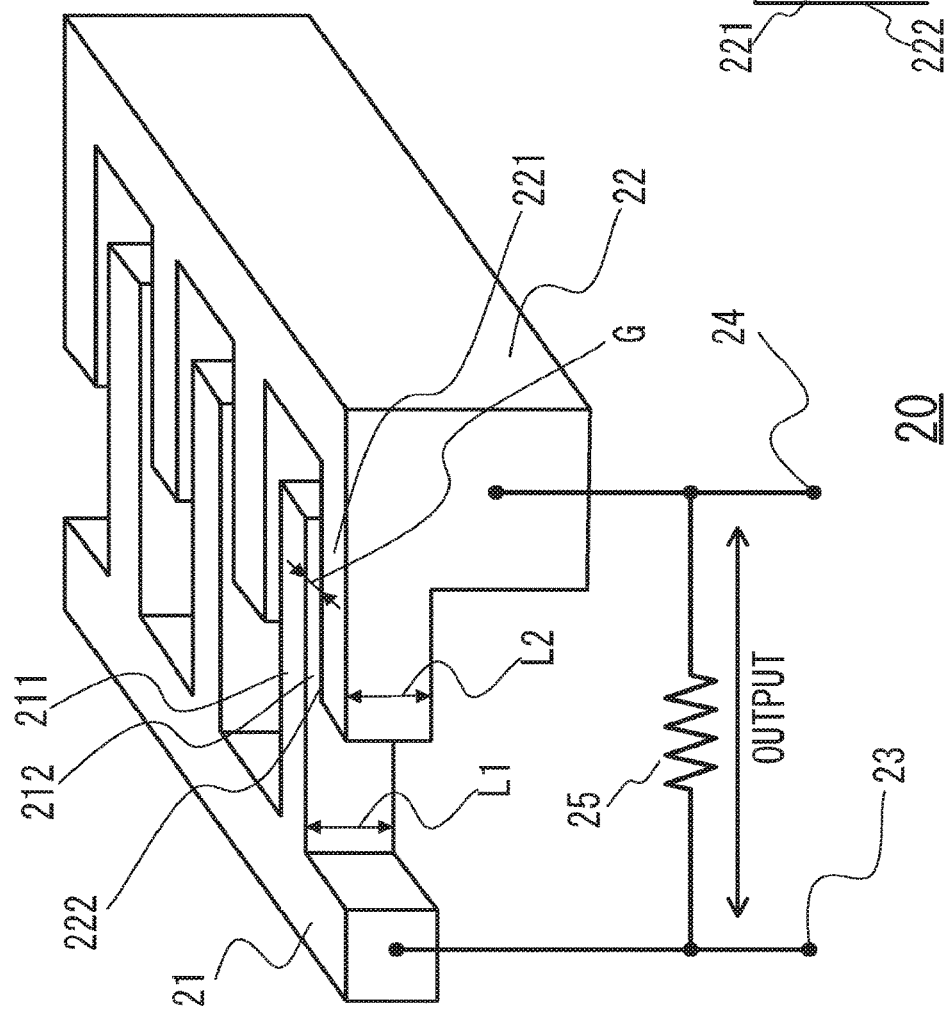
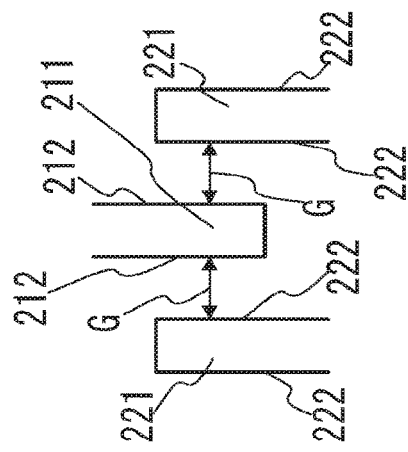
FIG. 1A
FIG. 1B

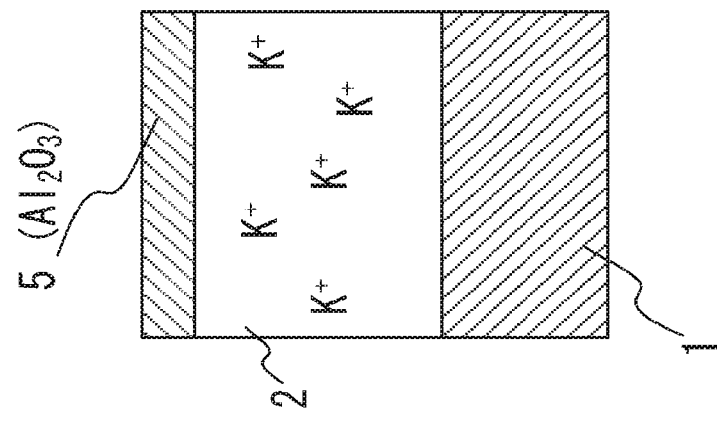
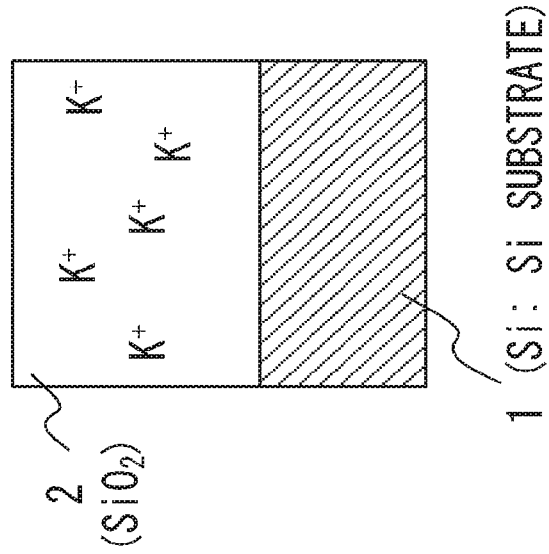

FIG.5

| FIRST PRECURSOR | SECOND PRECURSOR | FILM FORMING TEMPERATURE [°C] | DEPOSIT | CYCLE | DEPOSIT THICKNESS [nm] | DEPOSIT THICKNESS PER CYCLE [Å/CYCLE] |
|---|---|---|---|---|---|---|
| Al(CH$_3$)$_3$ | OXYGEN | 300 | Al$_2$O$_3$ | 184 | 20.43 | 1.11 |

ELECTRET ELEMENT, MICROPHONE HAVING ELECTRET ELEMENT MOUNTED THEREIN AND ELECTRET ELEMENT MANUFACTURING METHOD

CROSS REFERENCE TO RELATED APPLICATIONS

This application is a divisional of U.S. application Ser. No. 15/520,549, filed Apr. 20, 2017, which is a 371 of International Application No. PCT/JP2015/079018, filed Oct. 14, 2015, which claims priority from Japanese Patent Application No. 2014-215229, filed Oct. 22, 2014, the disclosures of which are expressly incorporated by reference herein.

TECHNICAL FIELD

The present invention relates to an electret element, a microphone having the electret element mounted therein and a method for manufacturing the electret element.

BACKGROUND ART

A condenser microphone includes a conversion element that converts vibrational energy to electrical energy. Such a conversion element may include an electret, i.e., a member capable of holding an electrical charge, which may be made possible by, for instance, applying a voltage to a dielectric material. In the following description, an element that includes an electret will be referred to as an electret element.

An electret is manufactured by, for instance, injecting a charge into an insulating film through corona discharge or adopting the method disclosed in PTL1.

The amount of electrical charge held in an electret decreases over time. This phenomenon is commonly known as charge decay. In addition, a property thereof that does not allow charge to readily decay is referred to as charge stability. The primary cause of charge decay is contact between the electret and water (moisture) in the air.

PTL2 discloses an invention whereby the charge stability in an electret structure is improved by giving it a water-repellent treatment through a hexamethyldisilazane surface treatment (HMDS treatment). However, the charge stability achieved through this invention by forming an extremely thin organic film at the surface of the electret structure is problematic.

Adoption of MEMS (micro electro-mechanical systems) technology has made it possible to form comb-tooth electrodes with a three-dimensional structure and thus manufacture compact conversion elements with greater capacitance between electrodes facing opposite each other. For instance, the conversion element disclosed in PTL 3 includes three-dimensional comb-tooth electrodes facing opposite each other with an electret disposed near a comb-tooth electrode and used as a means for applying a voltage between the electrodes.

A conversion element having three-dimensional comb-tooth electrodes with an electret disposed as described above is bound to have a high aspect ratio, i.e., the ratio of the distance between the electrodes facing opposite each other and the thickness of the comb teeth. There is an issue that needs to be addressed in such a conversion element with a high aspect ratio in that the full effect of HMDS treatment cannot be realized and thus good charge stability cannot be achieved.

CITATION LIST

Patent Literature

PTL1: JP 2013-13256 A
PTL2: JP 2008-182666 A
PTL3: JP 2010-011547 A

SUMMARY OF INVENTION

Technical Problem

There has been an increasing interest in electret elements adopting the comb-tooth structure with a high aspect ratio or a simple structure such as a flat-plane structure, which assures good charge stability.

Solution to Problem

An electret element according to a first aspect of the present invention comprises: an electret film that contains silicon oxide; and a protective film formed over the electret film and constituted of aluminum oxide deposited through an atomic layer deposition method.

According to a second aspect of the present invention, in the electret element according to the first aspect, it is preferable that the electret film contains alkali ions; and the electret element is obtained through application of heat and a voltage.

According to a third aspect of the present invention, in the electret element according to the first or the second aspect, it is preferable to further comprise electrodes having comb teeth with the electret film formed at side walls of the comb teeth; and the protective film is formed at the side walls.

According to a fourth aspect of the present invention, in the electret element according to the third aspect, it is preferable that the electrodes include a first electrode with first comb teeth formed as the comb teeth thereof and a second electrode with second comb teeth formed as the comb teeth thereof; the first comb teeth include first side walls, formed as the side walls thereof; the second comb teeth include second side walls, formed as the side walls thereof; and the first comb teeth and the second comb teeth are disposed in an interlace formation so that the first side walls and the second side walls face opposite each other with a predetermined gap therebetween.

A microphone according to a fifth aspect of the present invention has an electrostatic induction-type electro-mechanical conversion element constituted with the electret element according to the fourth aspect.

An electret element manufacturing method according to a sixth aspect of the present invention, comprises: forming a silicon oxide film containing alkali ions on a substrate, depositing aluminum oxide through an atomic layer deposition method onto the silicon oxide film; and inducing electric polarization by causing the alkali ions to move through a voltage application while heating the substrate.

According to a seventh aspect of the present invention, in the electret element manufacturing method according to the sixth aspect, it is preferable that the substrate includes first comb teeth and second comb teeth; and the electric polarization is induced by applying a voltage between the first comb teeth and the second comb teeth so as to cause the alkali ions to move while the substrate is heated.

Advantageous Effects of Invention

According to the present invention, an electret element with desirable film formation properties, which assures both good moisture resistance and good charge stability, can be provided. The advantageous effects of the present invention can be realized in an electret having a comb-tooth structure with a high aspect ratio with regard to the distance between the electrodes facing opposite each other and the thickness of the comb teeth, as well as in an electret having a simple structure such as a flat-plane structure. In addition, a microphone assuring good charge stability can be provided by mounting the electret element in a microphone.

BRIEF DESCRIPTION OF DRAWINGS

FIGS. 1A and 1B Illustrations of an electret element achieved in an embodiment of the present invention FIGS. 2 A and 2B Illustrations of the film-formation process through which an electret element is manufactured FIG. 3 A schematic illustration of a method adopted for forming a $SiO_2$ film containing $K^+$ ions FIG. 4 A flowchart of processing executed by adopting an atomic layer deposition method (ALD method)

FIG. 5 A chart presenting data related to an aluminum oxide film formed through the ALD method in the embodiment FIGS. 6 A and 6B Illustrations showing how polarization is achieved in the electret element FIG. 7 A chart indicating the charge stability achieved in the electret element in the embodiment in comparison to that in an electret element with its surface having undergone an HMDS treatment FIG. 8 An illustration of a microphone having the electret element mounted therein

DESCRIPTION OF EMBODIMENTS

Figure 3:
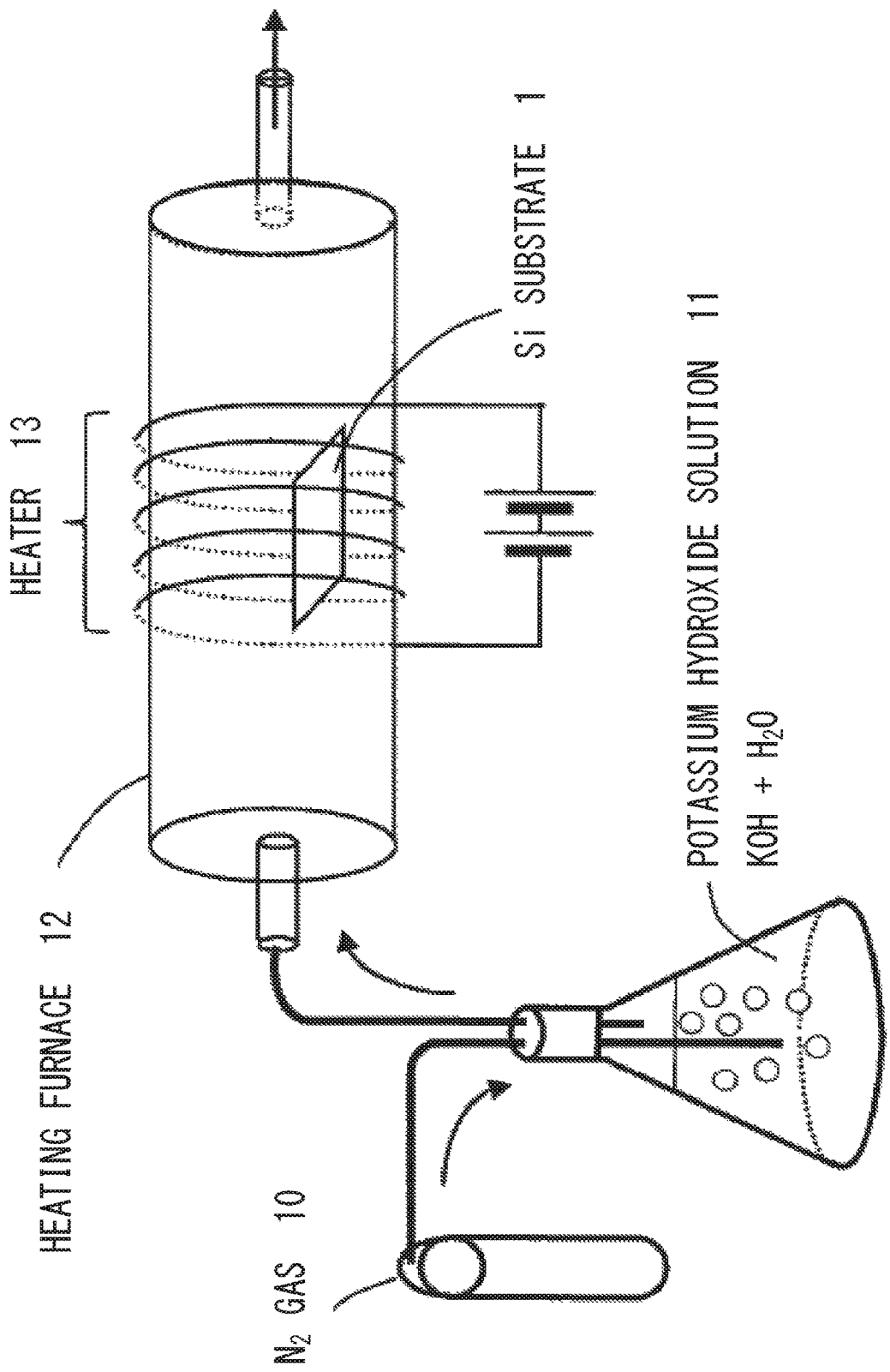

In the description of the present invention, a member that is caused to hold an electrical charge through, for instance, a voltage application to a dielectric material will be referred to as an electret. Enabling electrical charge retention through, for instance, application of a voltage to a dielectric material will be referred to as electretization. A film of an electret will be referred to as an electret film. An element that includes an electret film will be referred to as an electret element. In addition, cations of an alkali metal element or cations of an alkali earth metal element will be collectively referred to as alkali ions in the description of the present invention.

—Embodiment of Electret Element—

FIG. 1(a) is a schematic illustration of the structure adopted in an electret element 20 (vibration element 20). FIG. 1(b) presents an enlarged view of an area around comb-tooth electrodes 211 and 221 which will be described in detail later.

As FIG. 1(a) shows, the electret element 20 includes a movable electrode 21 and a fixed electrode 22. The movable electrode 21 includes a plurality of three-dimensional comb-tooth electrodes 211. The fixed electrode 22 includes a plurality of three-dimensional comb-tooth electrodes 221. The quantities of comb-tooth electrodes 211 and 221 are adjusted as needed in correspondence to the required output stipulated in the specifications of the electret element 20.

As FIG. 1(b) shows, the comb-tooth electrodes 211 each include side walls 212 assuming a length L1 measured along the thickness-wise direction. The comb-tooth electrodes 221 each include side walls 222 assuming a length L2, measured along the thickness-wise direction. The comb-tooth electrodes 211 and the comb-tooth electrodes 221 interlace so that a side wall 212 of a comb-tooth electrode 211 faces opposite a side wall 222 of a comb-tooth electrode 221 with a predetermined gap G therebetween. It is to be noted that the lengths L1 and L2 are each set to approximately 20 µm with the gap G set to approximately 1 µm in the embodiment.

An electret film constituted with an $SiO_2$ film containing $K^+$ ions, as will be explained later, is formed on the surfaces of the movable electrode 21 and the fixed electrode 22 (including the side walls 212 and 222). An aluminum oxide film is formed through an ALD method over the electret film, as will be described later. The aluminum oxide film is formed so as to act as a protective film which assures better charge stability through improved moisture resistance.

The movable electrode 21 in FIG. 1(a), which is supported by a resilient supporting member (not shown), is caused to vibrate by an external vibration communicated thereto. The supporting member is formed together with the movable electrode 21 and the fixed electrode 22 in the manufacturing process.

As the movable electrode 21 vibrates, the positional relationship of the comb-tooth electrodes 211 and the comb-tooth electrodes 221 relative to each other changes and a voltage is output between an output terminal 23 and an output terminal 24. It is to be noted that if the output is to be used as a current, a rectifier circuit may be connected in place of an output resistor 25 and a capacitor for storing a DC current resulting from the rectification may be added.

FIG. 2 illustrates a film formation process executed when manufacturing the electret element 20. An $SiO_2$ film 2 containing $K^+$ ions is formed over an Si substrate 1, as shown in FIG. 2(a). The method adopted when forming the $SiO_2$ film will be described later. The $K^+$ ions in the $SiO_2$ film 2 cannot move within the $SiO_2$ film 2 at room temperature.

Next, an aluminum oxide ($Al_2O_3$) film 5 is formed through an atomic layer deposition (ALD) method over the $SiO_2$ film 2, as illustrated in FIG. 2(b). This aluminum oxide film 5 is formed to act as a protective film so as to assure better charge stability by improving moisture resistance. It is to be noted that the formation of the aluminum oxide film 5 through the ALD method will be described later.

FIG. 3 schematically illustrates how the $SiO_2$ film 2 containing $K^+$ ions is formed. Through this method, an $SiO_2$ film 2 is formed on an Si substrate through wet oxidation. $N_2$ gas is led to pass through an aqueous solution prepared by dissolving KOH in pure water in order to add water vapor containing K+ ions into the $N_2$ gas. As the Si substrate 1, i.e., the base for the electret element, placed inside a heating furnace 12, is heated while supplying this N2 gas into the heating furnace 12, an $SiO_2$ film 2 containing $K^+$ ions is formed over the surface of the Si substrate 1.

While a description is given in reference to the example in which a film containing $K^+$ ions is formed, an $SiO_2$ film containing another type of alkali ions, i.e., cations of an alkali metal element or cations of an alkali earth metal element, can be formed in conjunction with an aqueous solution prepared by dissolving an appropriate substance into pure water.

Figure 4:
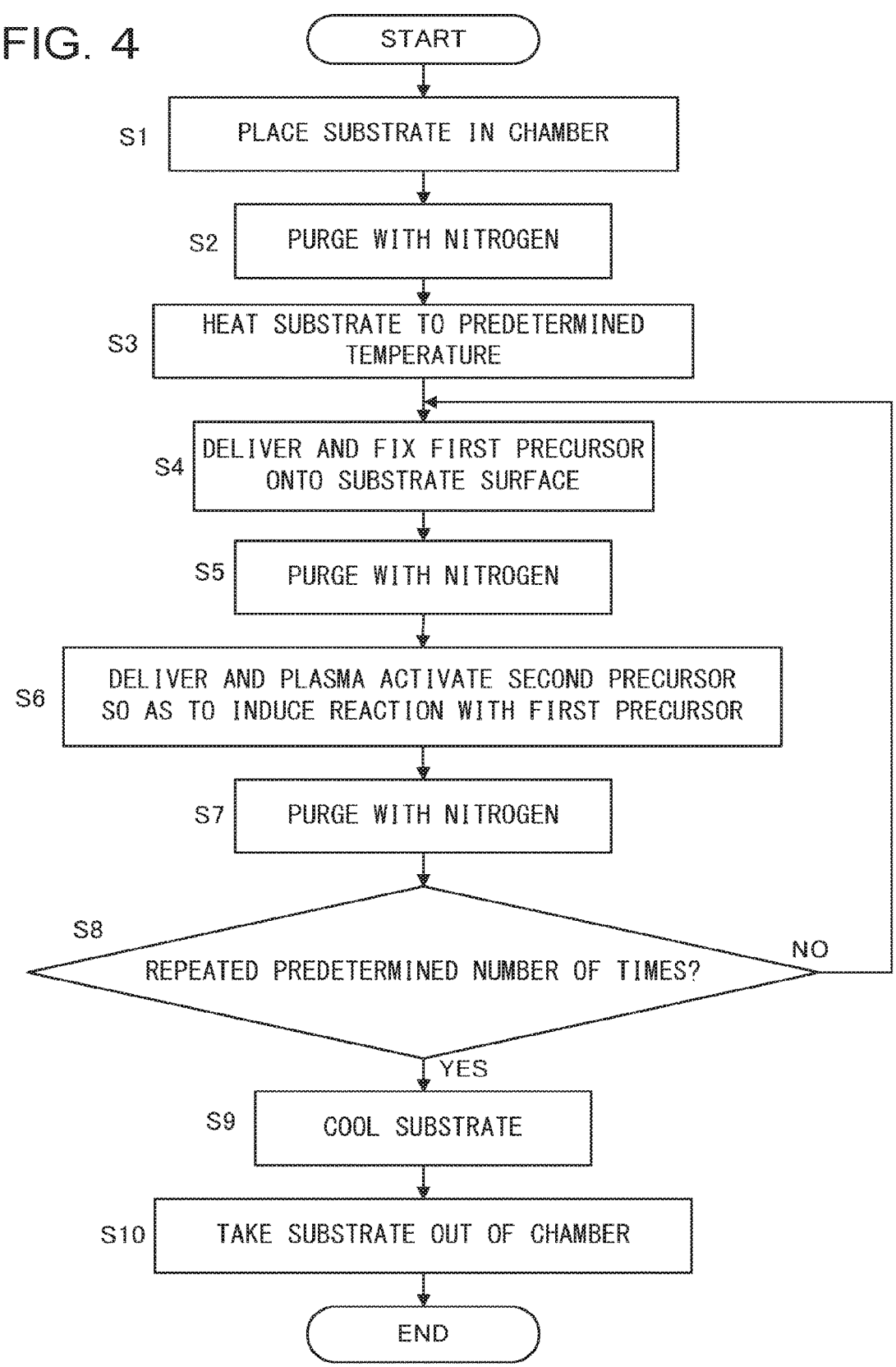

FIG. 4 presents a flowchart of ALD processing steps executed in the embodiment.

In the ALD method adopted in the embodiment, which is commonly known as the plasma activated ALD method, a first precursor is bonded onto a surface of the deposition object and then a second precursor, which is plasma-activated, is deposited as it reacts with the first precursor.

In reference to FIG. 4, the method for forming the aluminum oxide film 5 will be explained.

In step S1, the Si substrate (hereafter will be referred to as the substrate) in FIG. 2(a) is placed in the chamber of a vacuum processing device. In step S2, the internal space of the chamber is purged with nitrogen.

In step S3, the substrate is heated to a predetermined temperature. In the embodiment, the substrate is heated to 300° C. It is to be noted that a film can be formed even at room temperature through the plasma activation ALD method adopted in the embodiment.

In step S4, trimethylaluminum (TMA:Al (CH$_3$)$_3$) used as the first precursor is delivered into the chamber where the trimethylaluminum becomes bonded onto the surface of the substrate. Once the trimethylaluminum is bonded onto the substrate, the inner space of the chamber is purged with nitrogen in step S5. Through this nitrogen purge, any excess trimethylaluminum that has not bonded to the surface of the substrate is expelled from the chamber.

In step S6, oxygen used as the second precursor is delivered into the chamber. The oxygen delivered into the chamber is plasma-activated with a 300 W output so as to induce a reaction with the trimethylaluminum having bonded to the surface of the substrate. As a result, aluminum oxide is formed on the substrate surface. Subsequently, the inner space of the chamber is purged with nitrogen in step S7 so as to expel any byproduct of the reaction from the chamber.

These steps S4 through S7 constitute a single cycle of processing. It is to be noted that the thickness of the trimethylaluminum layer bonded to the substrate surface in step S4 through a single cycle is equivalent to the thickness of a single molecule of trimethylaluminum and accordingly, a single atomic layer of aluminum oxide is formed in step S6 of the cycle.

In step S8, a decision is made as to whether the cycle described above has been repeated over a predetermined number of times. If a negative decision is made, the operation shifts to step S4, whereas if an affirmative decision is made, the operation shifts to step S9. Namely, the cycle described above, constituted of steps S4 through S7, is repeated over the predetermined number of times. It is to be noted that if film formation is to be executed in reference to a target thickness for the aluminum oxide film 5 instead of in reference to the number of cycles, it is necessary to determine the thickness of the deposit accumulated per cycle through advance testing. Through advance testing (not shown) conducted in the embodiment, the deposit accumulated after 200 cycles was found to have a thickness of 21.75 nm and based upon this finding, the thickness of the deposit per cycle was calculated to be 1.09 [A/per cycle]. Based upon this deposit thickness per cycle, the deposition cycle was executed 184 times (i.e., the predetermined number of repetitions) so as to form an aluminum oxide film 5 achieving a thickness of 20 nm at the surface of the electret element in the embodiment (see FIG. 5).

Once the film is formed through deposition by repeating the cycle over the predetermined number of times, the substrate is cooled in step S9 before it is taken out of the chamber.

FIG. 5 presents a chart of data related to the aluminum oxide film 5 formed at the surface of the electret element in the embodiment. Based upon the results of the advance testing described above, an aluminum oxide film 5 with a thickness of 20.43 nm, substantially achieving the target thickness, was obtained.

As explained earlier, L1 and L2, representing the lengths of the side walls of the tooth comb electrodes measured along the thickness-wise direction, are both approximately 20 μm. The gap G between the comb-tooth electrodes is approximately 1 μm. The aluminum oxide film formed through the ALD method in the embodiment demonstrates uniform film formation characteristics even at the surface of the comb-tooth electrodes with a high aspect ratio, i.e., the lengths L1 and L2 being large relative to the gap G. Since this results in good moisture resistance, the charge stability of the electret element 20 can be improved, as will be explained later (see FIG. 7).

Figure 6:
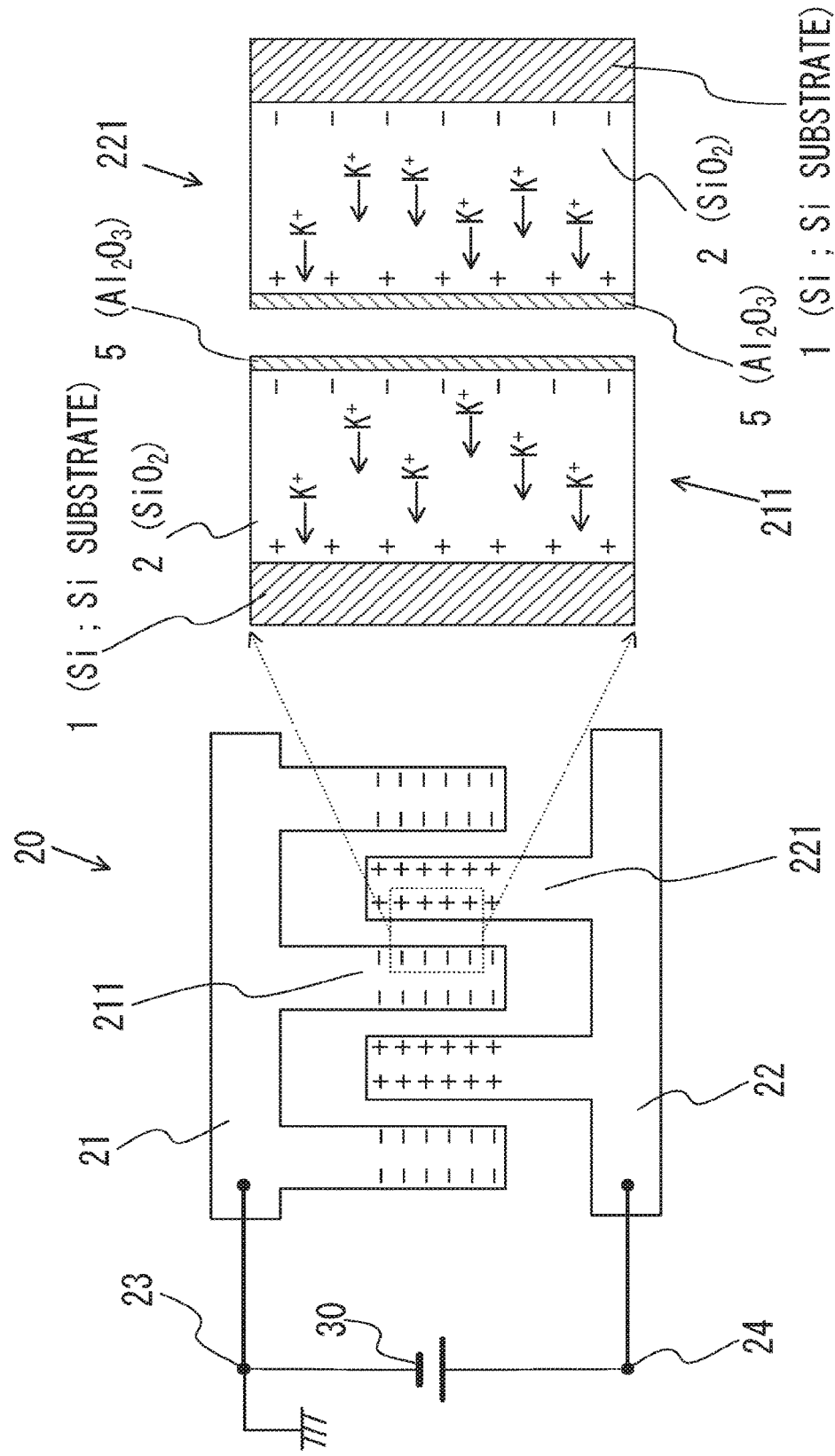

FIG. 6(a) illustrates how polarization for the movable electrode 21 and the fixed electrode 22 is achieved at the electret element 20. FIG. 6(b) presents a schematic sectional view of an area near the surfaces of a comb-tooth electrode 211 of the movable electrode 21 and a comb-tooth electrode 221 of the fixed electrode 22 in the electret element 20.

In the embodiment, the movable electrode 21 and the fixed electrode 22 in the electret element 20 are polarized through the Bias-Temperature (B-T) method disclosed in Japanese Laid Open Patent Publication No. 2013-13256. Polarization is achieved by applying a DC voltage between the movable electrode 21 and the fixed electrode 22 while the movable electrode 21, connected to the negative pole side of a DC power source 30, and the fixed electrode 22, connected to the positive pole side of the DC power source 30, are heated to 630° C., as illustrated in FIG. 6(a). Through this polarization process, the K$^+$ ions contained in the SiO$_2$ film 2 at the comb-tooth electrode 211 move to the left within the SiO$_2$ film 2, as shown in the figure, i.e., toward the Si substrate 1. The K$^+$ ions contained in the SiO$_2$ film 2 at the comb-tooth electrode 221 move to the left within the SiO$_2$ film 2 as shown in the figure, i.e., towards the aluminum oxide film 5. After the K$^+$ ions move through the SiO$_2$ film 2 at the comb-tooth electrodes 211 and 221 as described above, the temperature of the movable electrode 21 and the fixed electrode 22 is brought down to room temperature while continuously applying the DC voltage, so as to fix the K$^+$ ions at the new positions within the SiO$_2$ film 2 and individually electretize the SiO$_2$ film 2 at the comb-tooth electrodes 211 and the SiO$_2$ film 2 at the comb-tooth electrodes 221. Subsequently, application of the DC voltage is terminated. Through the process described above, the area near the surface of each comb-tooth electrode 211 becomes negatively charged whereas the area near the surface of each comb-tooth electrode 221 becomes positively charged, as illustrated in FIG. 6(b).

The following advantages and operations are achieved in the electret element structured as described below in the embodiment.

(1) A film 2 that contains silicon oxide (SiO$_2$) is formed and a protective film 5 constituted of aluminum oxide, deposited through an atomic layer deposition method (ALD method), is formed over the film 2 at the electret element 20.

This structure assures better moisture resistance while limiting charge decay and, as a result, an electret element demonstrating good charge stability can be obtained.

(2) The film 2 is formed in a state in which K$^+$ ions are present in the film 2 and, as a voltage is applied thereto while it is heated, it becomes electretized. Such an electret film demonstrates better charge stability in comparison to an electret film formed through a corona discharge.

(3) The electret film 2 is formed at the side walls 212 and 222 of the comb-tooth electrodes 211 and 221. The aluminum oxide film 5 is formed as a protective film over the electret film 2 formed at the side walls 212 and 222.

As a result, better moisture resistance is achieved even over the side walls 212 and 222 of the comb-tooth electrodes 211 and 221 where a protective film could not be formed readily due to a high aspect ratio and consequently, even better charge stability is assured at the electret element 20.

It is to be noted that formation of a protective film at the side walls 212 and 222 of the comb-tooth electrodes 211 and 221, where a film could not be formed with ease under normal circumstances, is made possible through adoption of the ALD method.

Figure 7:
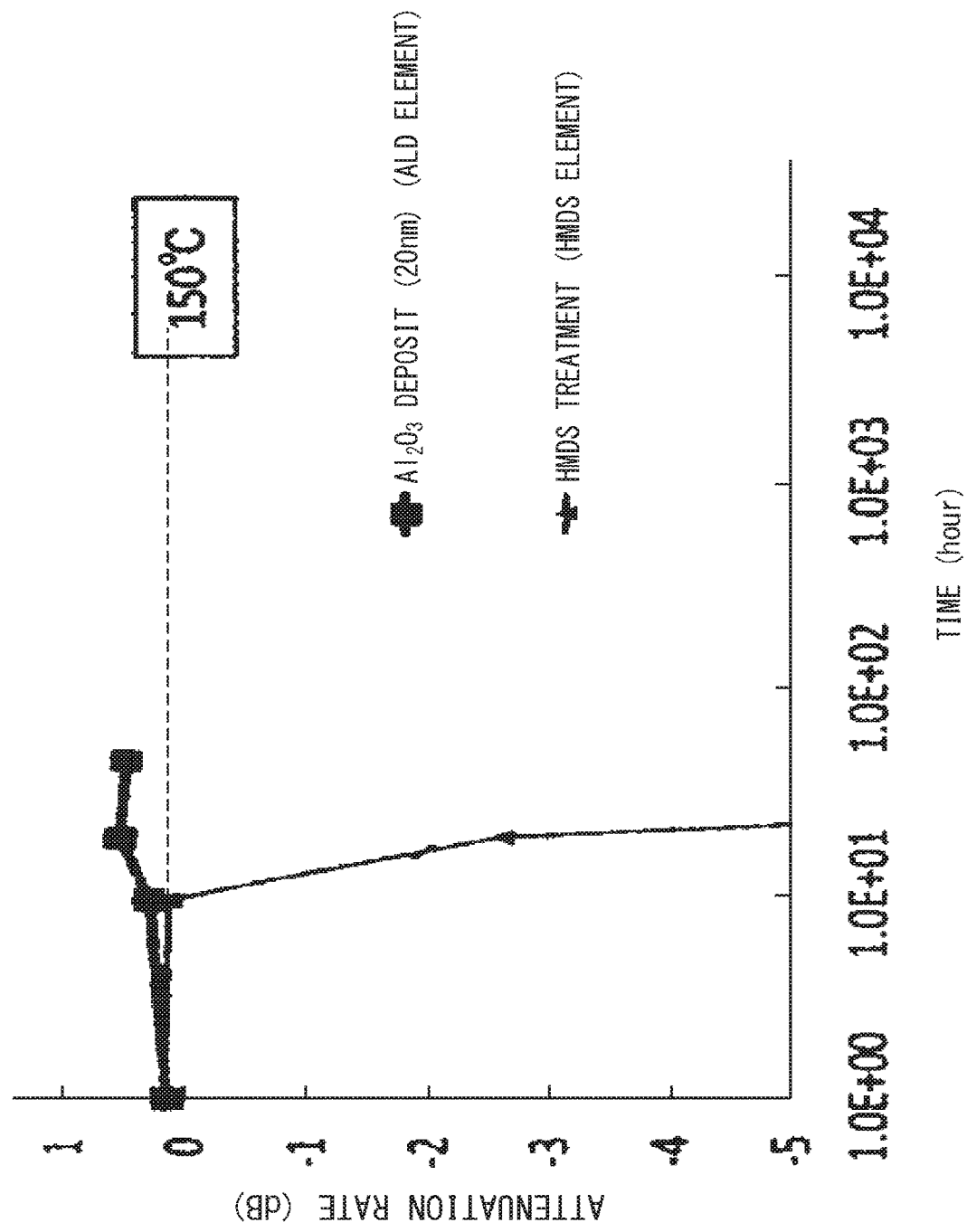

FIG. 7 presents a graph of the charge stability demonstrated at the electret element achieved in the embodiment by forming a protective film constituted with the aluminum oxide film 5 at the surface thereof (hereafter referred to as an ALD element) in comparison to the charge stability demonstrated at an electret element such as that disclosed in PTL 2, with the surface thereof having undergone an HMDS treatment (hereafter referred to as an HMDS element). As FIG. 7 indicates, an electrical charge can no longer be held in the HMDS element beyond 10 hours. In contrast, the electrical charge is steadily held in the ALD element well beyond 10 hours. In other words, the electret element 20 in the embodiment having the aluminum oxide film 5 formed thereat obviously demonstrates better charge stability.

—Embodiment of Microphone—

Figure 8:
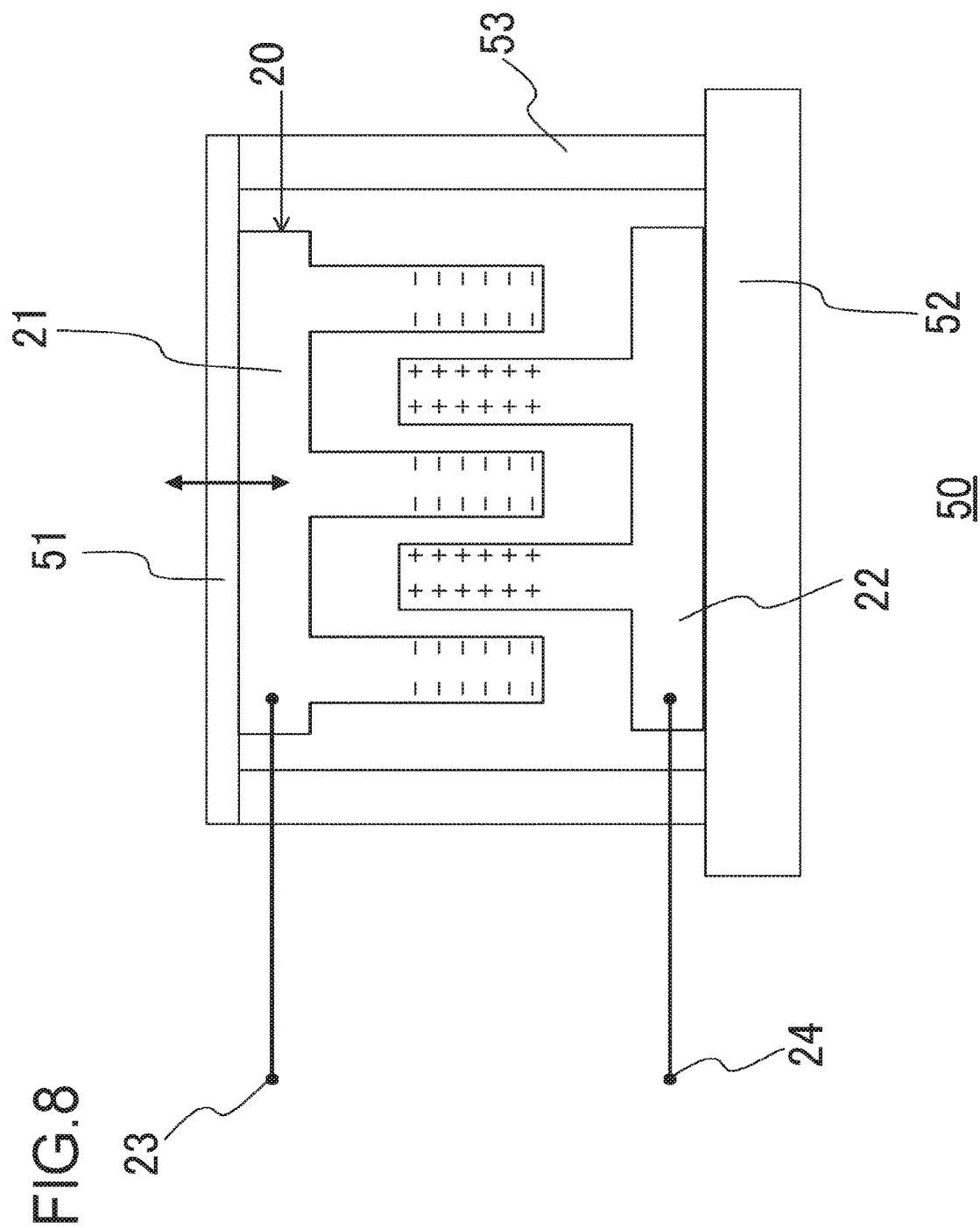

FIG. 8 schematically illustrates an example of a condenser microphone 50, achieved by mounting therein the electret element 20, to function as an electrostatic induction-type electro-mechanical conversion element. The condenser microphone 50 comprises a diaphragm 51, a back plate 52, a supporting member 53 having an insulating property, which connects the diaphragm 51 with the back plate 52, and the electret element 20.

The electret element 20 includes a movable electrode 21, a fixed electrode 22, an output terminal 23 for the movable electrode 21 and an output terminal 24 for the fixed electrode 22. The movable electrode 21 is disposed at the diaphragm 51. The fixed electrode 22 is disposed at the back plate 52.

The movable electrode 21 and the fixed electrode 22 include electret films having polarities different from each other, and thus, an electric field is formed between the movable electrode 21 and the fixed electrode 22. As a wave such as a sound wave causes the diaphragm 51 to vibrate, the movable electrode 21, too, vibrates, resulting in a change in its position relative to the fixed electrode 22. This change in the relative position, in turn, causes the voltage between the output terminal 23 and the output terminal 24 to change. The wave, such as a sound wave, having caused vibration of the diaphragm 51, can be estimated by detecting the change in the voltage.

The following variations, too, are within the scope of the present invention.

While an electret element is obtained through the embodiment described above by forming a silicon oxide film containing alkali ions through wet oxidation, forming an aluminum oxide film to act as a protective film through the ALD method over the silicon oxide film and electretizing the silicon oxide film through the Bias-Temperature method (B-T method), the present invention is not limited to this example. For instance, the protective film constituted with the aluminum oxide film, formed through the ALD method in the embodiment, may instead be formed over a silicon oxide film electretized through corona discharge.

The present invention is in no way limited to the details described above and any other mode conceivable within the technical range of the present invention is also within the scope of the present invention. For instance, while a protective film is formed through the ALD method over the surfaces of an element that includes comb-tooth electrodes in the embodiment described above, the present invention may be adopted in an element having a simple shape, such as a flat-plane element, since its advantageous effects are realized at the element according to the present invention, which assumes a complex structure at the surface thereof.

The disclosure of the following priority application is herein incorporated by reference:

Japanese Patent Application No. 2014-215229 filed Oct. 22, 2014

REFERENCE SIGNS LIST

1: Si substrate
2: $SiO_2$ film (electret film)
5: aluminum oxide film (protective film)
20: electret element
21: movable electrode
22: fixed electrode
23, 24: output terminal
25: output resistor
50: condenser microphone
51: diaphragm
52: back plate
53: supporting member
211: comb-tooth electrode
212: side wall
221: comb-tooth electrode
222: side wall
G: gap
L1, L2: length

The invention claimed is:

1. An electret element manufacturing method, comprising the steps of:
    performing a first processing to form a silicon oxide film containing alkali ions on a substrate,
    performing a second processing to deposit an aluminum oxide film through an atomic layer deposition method onto the silicon oxide film; and
    after having carried out the second processing, performing a third processing to induce electric polarization by causing the alkali ions to move in the silicon oxide film through a voltage application while heating the substrate.

2. The electret element manufacturing method according to claim 1, wherein:
    the substrate includes first comb teeth and second comb teeth; and
    in the third processing, the electric polarization is induced by applying a voltage between the first comb teeth and the second comb teeth so as to cause the alkali ions to move while the substrate is heated.

* * * * *